US011575730B1

(12) United States Patent
Britt et al.

(10) Patent No.: US 11,575,730 B1
(45) Date of Patent: *Feb. 7, 2023

(54) VIRTUAL DATA CENTERS

(71) Applicant: 8x8, Inc., Campbell, CA (US)

(72) Inventors: Timothy Britt, Campbell, CA (US);
Bryan R. Martin, Campbell, CA (US);
Christopher Peters, Campbell, CA (US)

(73) Assignee: 8x8, Inc., Campbell, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/731,702

(22) Filed: Apr. 28, 2022

Related U.S. Application Data

(63) Continuation of application No. 17/113,829, filed on Dec. 7, 2020, now Pat. No. 11,323,503, which is a continuation of application No. 14/546,026, filed on Nov. 18, 2014, now Pat. No. 10,862,948.

(60) Provisional application No. 61/983,792, filed on Apr. 24, 2014, provisional application No. 61/975,371, filed on Apr. 4, 2014.

(51) Int. Cl.
*H04L 67/02* (2022.01)
*H04L 65/403* (2022.01)
*H04L 41/22* (2022.01)

(52) U.S. Cl.
CPC .............. *H04L 67/02* (2013.01); *H04L 41/22* (2013.01); *H04L 65/403* (2013.01)

(58) Field of Classification Search
None
See application file for complete search history.

(56) References Cited

U.S. PATENT DOCUMENTS

2009/0288084 A1* 11/2009 Astete ................ G06Q 30/0603
718/1

* cited by examiner

*Primary Examiner* — Tonia L Dollinger
*Assistant Examiner* — Ishrat Rashid
(74) *Attorney, Agent, or Firm* — Crawford Maunu PLLC

(57) ABSTRACT

Various example implementations are directed to circuits, apparatuses, and methods for providing virtual computing services. One example involves a set of computing servers communicatively coupled to the data storage device. The set of computer servers provide a respective virtual data center for each of a plurality of accounts, and the respective virtual data center for each account provides virtual services specified in a respective settings file for the account stored in the data storage device. The virtual data center for at least one of the accounts includes a set of virtual desktops and a set virtual servers, including at least one Voice-over-IP (VoIP) server. The VoIP server provides VoIP service for a plurality of users of the account.

20 Claims, 3 Drawing Sheets

VIRTUAL DATA CENTERS

OVERVIEW

Computing servers are increasingly being used to provide various services over a network including, but not limited to, web site hosting, remote data storage, remote computing services, virtual computing environments, and communication services such as: Voice-over-IP (VoIP), video conferencing, call exchange servers, and packet switching, and traffic management. For ease of reference, the various applications, systems and services that may be provided by computing servers may be collectively referred to as remote services.

SUMMARY

Various example implementations are directed to circuits, apparatuses, and methods for providing virtual computing services. According to an example embodiment, an apparatus includes a data storage device and a set of computing servers communicatively coupled to the data storage device. The set of computer servers are configured to provide a respective virtual data center for each of a plurality of accounts. The respective virtual data center for each account is configured to provide virtual services specified in a respective settings file for the account stored in the data storage device. The virtual data center for at least one of the accounts includes a set of virtual desktops and a set virtual servers, including at least one VoIP server. The VoIP server provides VoIP service for a plurality of users of the account.

In another example embodiment, a method provides virtual servers for multiple accounts. For each of a plurality of accounts, a respective settings file is stored in a data storage device. Using a set of computing servers, a respective virtual data center is provided for each of the plurality of accounts. The virtual data center for each account is configured to provide virtual services specified in the respective settings file for the account. The virtual data center for a first account includes a set of virtual desktops and a set virtual servers. The set of virtual servers includes at least one VoIP server configured to VoIP service for a plurality of users of the account.

According to yet another example embodiment, an apparatus includes a circuit means for storing respective settings file for each of a plurality of accounts. The apparatus also includes a computing circuit means for providing a respective set of virtual servers for each of a plurality of accounts. The virtual data center for a first account of the plurality of accounts includes a set of virtual desktops and a set virtual servers. The set of virtual servers includes at least one VoIP server configured to VoIP service for a plurality of users of the account.

BRIEF DESCRIPTION OF THE DRAWINGS

The disclosure may be more completely understood in consideration of the following detailed description of various embodiments of the disclosure in connection with the accompanying drawings, in which.

Figure 1:
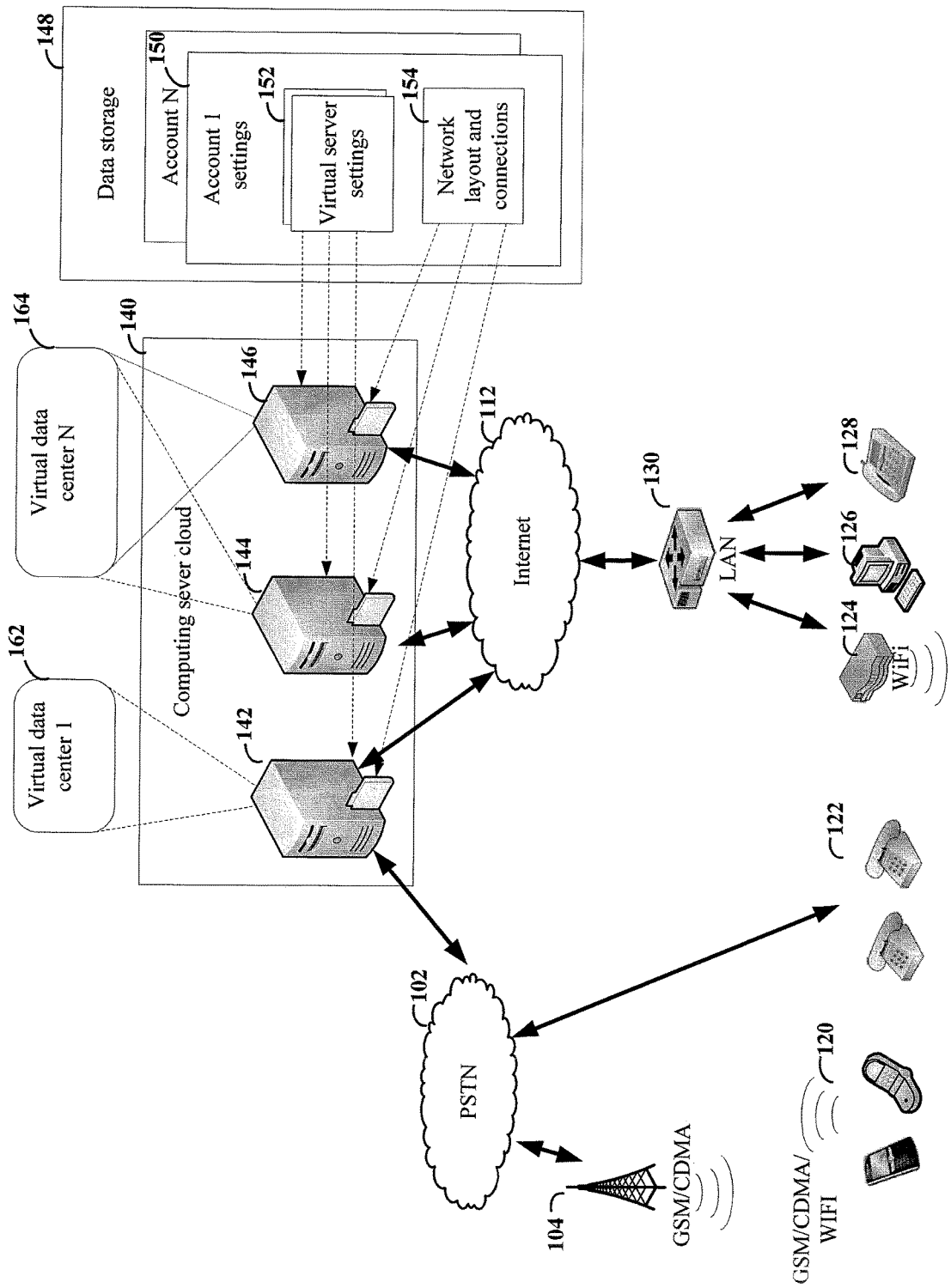
FIG. 1 shows an example network architecture having a set of servers configured to provide virtual services for a plurality of accounts.

While various embodiments are amenable to various modifications and alternative forms, specifics thereof have been shown by way of example in the drawings and will be described in detail. It should be understood, however, that the intention is not to limit the disclosure to the particular examples and embodiments described. On the contrary, the intention is to cover all modifications, equivalents, and alternatives falling within the spirit and scope of the disclosure.

DETAILED DESCRIPTION

Aspects of the present disclosure are believed to be applicable to a variety of different types of apparatuses, systems, and methods involving computing servers. Various example implementations are directed to circuits, apparatuses, and methods for providing a respective virtual data center for each of a plurality of accounts. The disclosed circuits, apparatuses and methods may be useful in a variety of applications. As one example, a virtual data center may be used to provide a virtual office in which remote employees can access company resources and communicate with other employees and/or customers in an efficient manner. While the disclosed embodiments are not necessarily limited to such applications, various aspects of the present disclosure may be appreciated in this context.

In one or more implementations, an apparatus includes a data storage device and one or more computing servers communicatively coupled to the data storage device. The computing servers are configured to provide a respective virtual data center for each of a plurality of accounts. The virtual data center for an account includes a group of virtual desktops and/or virtual servers indicated in a respective settings file for the account. For example, the virtual data center for an account may include a set of virtual desktops and a set of virtual servers, including at least one VoIP server. The VoIP server may be used to provide VoIP service for a plurality of users of the account.

The settings file for each account may include server settings for each virtual desktop and/or virtual servers included in the respective virtual data center. The server settings may include a pointer to a VMware image and also specify computing resources to dedicate the execution of the corresponding virtual desktops and/or virtual servers. The virtual servers may provide various types of services including, for example file servers, email servers, web hosting, virtual meeting services (e.g., Voice-over-IP), billing, and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, the computing services emulate the virtual data center by emulating the virtual desktops and/or virtual servers indicated in the server settings and also emulating a virtual network connecting the virtual desktops and/or virtual servers. The virtual network includes the virtual connections specified in the respective settings file for the account. In some implementations, emulation of the virtual data center includes execution of a resource management process, configured to assign computing resources allocated for the data center for emulation of the virtual desktops, virtual servers, and connections of the data center.

In some implementations, the virtual data center provides a perimeter firewall between an internal network of the virtual data center and an external network. The perimeter firewall may provide network protection for the virtual data center with stateful packet inspection, access-control lists, network address translation (NAT) and/or virtual private network (VPN) connections. In some implementations, the virtual data center may also include individual firewalls isolating one or more virtual servers/desktops from other virtual servers/desktops in the virtual data center. In some implementations a web-based graphical user interface (GUI) is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN), compute and network infrastructure. VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial-attached-SCSI (SAS) connectors attaching it to diverse storage processors inside the storage area network. The dual SAS connections allow the storage area network to see the disks on separate data paths and, in the event of a failure, re-route the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/ time, memory, or storage) for the account to particular virtual desktops and/or virtual servers in the data center. The GUI may also provide a mechanism to import and/or replicate virtual machines in the data center. In some implementations, the GUI may provide the ability to save a backup or snapshot of the layout and configuration of the virtual data center.

The disclosed embodiments are applicable to various different types of computing servers including physical and/or virtual servers, which may provide various remote services including, for example, file servers, email servers, web hosting, virtual meeting services (e.g., Voice-over-IP), billing, and/or remote computing services (e.g., virtual desktops, virtual private servers, and/or virtual enterprise services). While the disclosed embodiments are not necessarily limited to such applications, various aspects of the present disclosure may be appreciated through a discussion of various examples in this context.

Turning now to the figures, FIG. 1 shows a communication network including a computing server cloud 140 having a plurality of computing servers (142, 144, and 146) configured to provide respective virtual data centers 162 and 164 for a plurality of accounts. The virtual data centers 162 and 164 may be accessed by various end-point devices including, for example, mobile devices 120, plain-old telephones (POTS) 122, computer(s) 126, and IP phones 128. For each account, the computing servers (142, 144, and 146) provide a respective virtual data center. The virtual data center includes various virtual servers and/or virtual desktops configured according to virtual server settings 152 in a respective settings file 150 for the account. In this example, the settings file 150 for each account is stored in a data storage 148 communicatively coupled to the computing server cloud 140. The virtual servers and/or virtual desktops are connected according to network layout and connections 154 specified in the respective settings file 150 for the account.

In this example, a first computing server 142 is configured to provide a virtual data center 162 for a first account. Second and third computing servers 144 and 146 provide a virtual data center 164 for a different account. The computing servers may include various computing/networking resources. For instance, in this example, the first computing server 142 includes a connection to public service telephone network (PSTN) 102 which may be used to emulate a virtual Voice-over-IP (VoIP) server in the virtual data center 162. Data transactions related to the remote services provided by the virtual data centers 162 and 164 may be communicated between the computing servers and the remote users over various data networks including, for example, the Internet 112, PSTN 102, wireless networks 104 (e.g., GSM, CDMA, or LTE), and private data networks, including, but not limited to LAN 130, WiFi network 124, and/or Private Branch Exchange servers (not shown).

Figure 2:
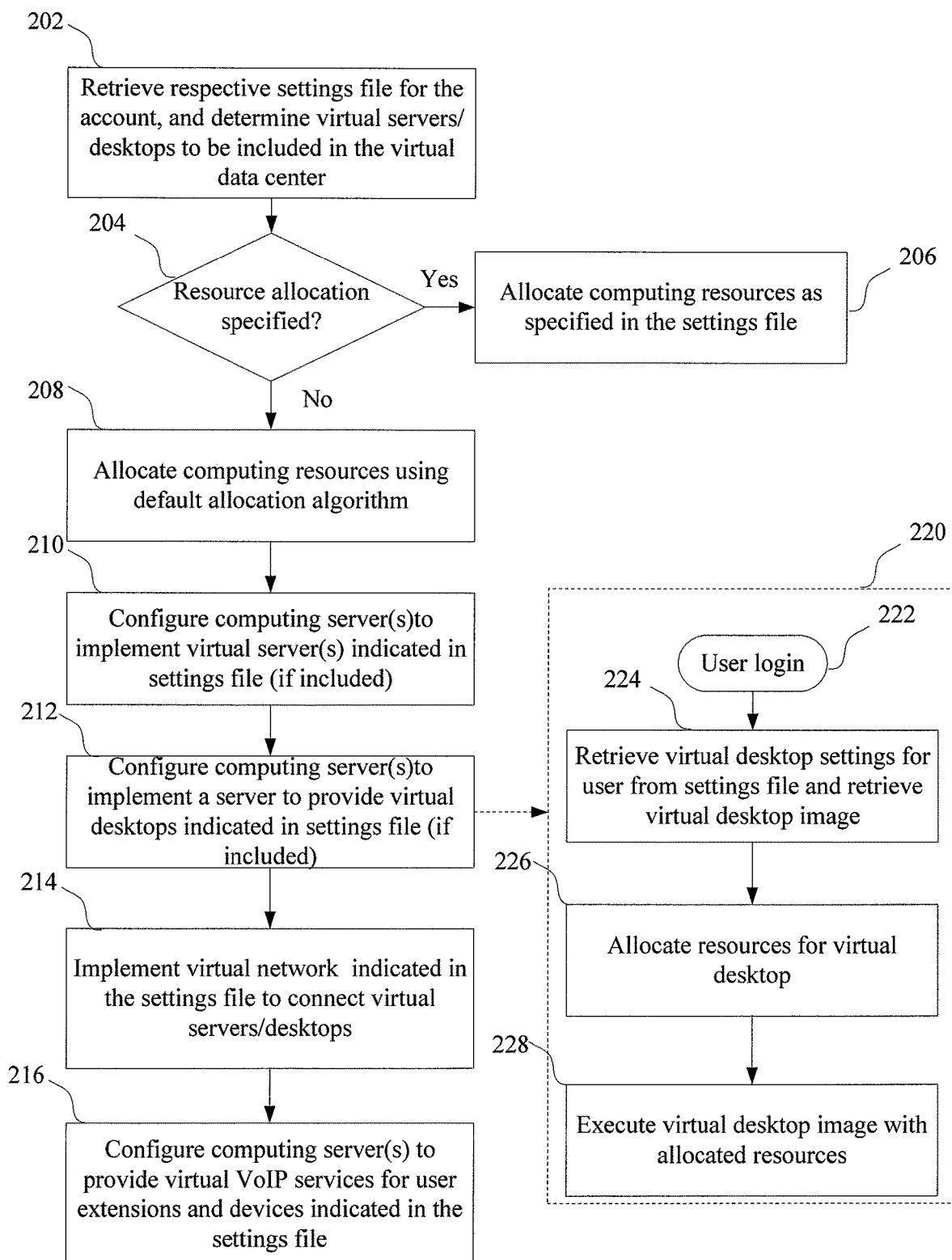
FIG. 2 shows a process for providing a virtual data center for one of a plurality of account.

FIG. 2 shows a process for providing a virtual data center for one of a plurality of accounts. At block 202, a respective settings for the account is retrieved and virtual servers/ desktops to be included in the virtual data center are determined. Computing resources are allocated to implement the virtual servers/desktops at blocks 206 or 208. The computing resources may include, for example, processing resources (e.g., processing cores and processing time), memory resources, data storage resources, and/or network resources. In some implementations, an allocation of computing resources may be specified in the settings file for an account. In this example, if a resource allocation is not specified in the retrieved setting, decision block 204 directs the process to allocate computing resources using a default allocation algorithm at block 208. Otherwise, decision block 204 directs the process to allocate computing resources as specified in the settings file at block 206. The allocation specified in the settings file may be a fixed allocation (e.g., an allocation table) or may be an allocation function that allocates resources based on various criteria such as processing load, number of users, and/or priority of the virtual services. For instance, an allocation function for an account may be configured to prioritize allocation of network resources for VoIP services, in which network latency is less noticeable by users, in comparison to some other network services.

If one or more virtual servers are indicated in the settings file, a set of computing servers are configured at block 210 to implement the virtual servers with the resources allocated for the virtual servers. If virtual desktops are indicated in the settings, the computing servers are configured at block 212 to implement a server with the allocated resources to provide the virtual desktops. For example, the server may be configured to provide respective virtual desktops for remote employees in a virtual office. Block 220 shows an example sub-process that may be performed by the server to implement virtual desktops for a plurality of users. In response to a user login 222, virtual desktop settings for the user are retrieved from the settings file at block 224. A virtual desktop image corresponding to the user is also retrieved at block 224. At block 226, resources are allocated/reallocated by the sub-process 220 for the virtual desktop. The virtual desktop image is executed with the allocated resources at block 228 to provide the virtual desktop to the user.

At block 214, the computing servers are configured to implement a virtual network indicated in the settings file. The virtual network includes network connections to connect the virtual desktops and virtual servers in a network. The virtual network may also include various network devices or channels, such as routers, firewalls, and/or virtual private network (VPN) channels, which are configured according to network configuration settings provided in the settings file. At block 216, computing servers are configured to implement a VoIP server configured to provide VoIP services for user extensions and devices indicated in the settings file. For example, the VoIP server may be configured to implement a virtual private branch exchange (PBX) server to route incoming and outgoing calls to and from remote employees in a virtual office.

Figure 3:
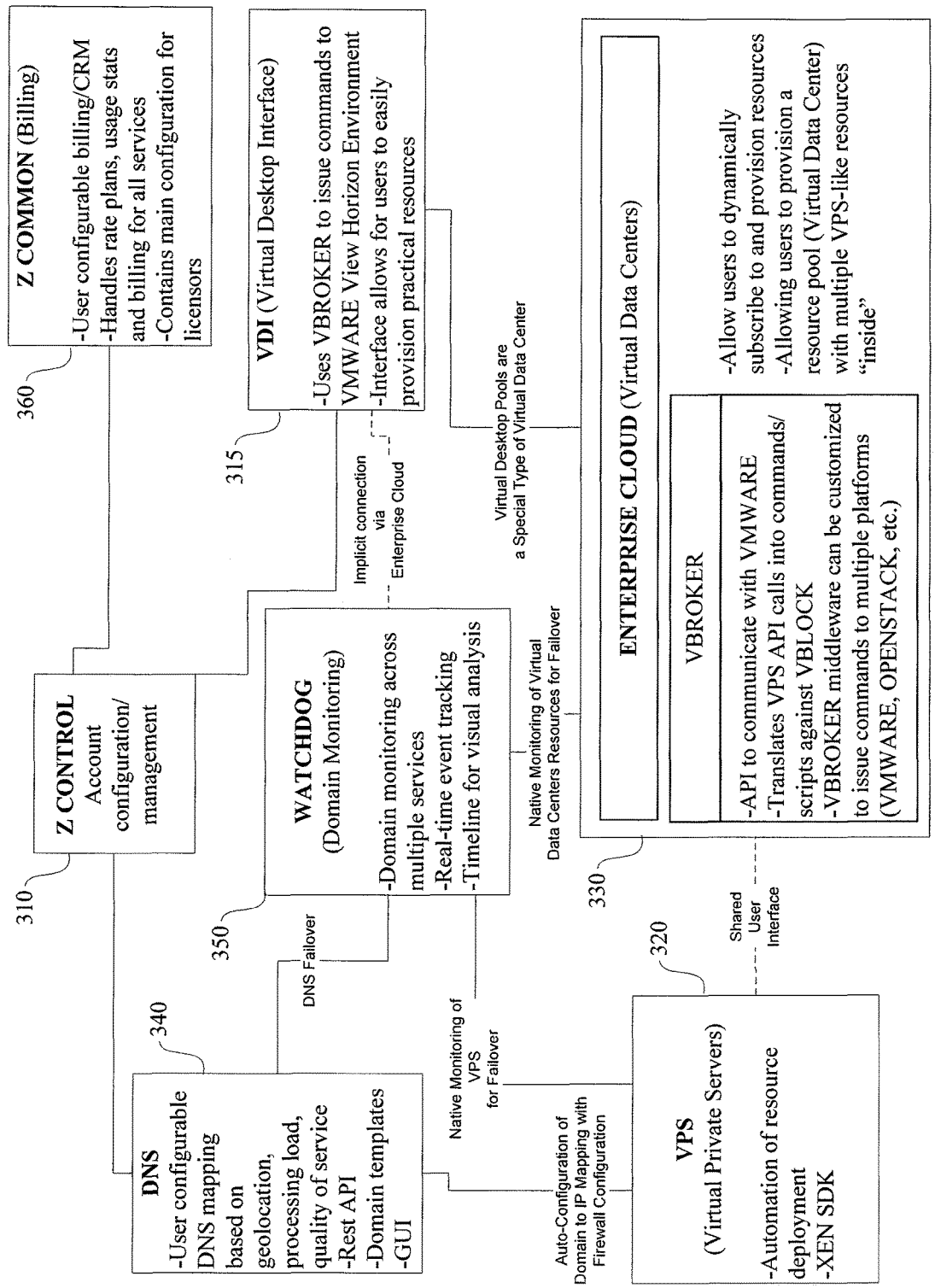
FIG. 3 shows a block diagram of an example system configured to provide respective groups of virtual services for a number of accounts, in accordance with one or more implementations.

FIG. 3 shows a block diagram of an example system configured to provide respective groups of virtual services for a number of accounts, and provide customizable billing for each account. FIG. 3 shows various subsystems included in the example system (Z_system). The system includes multiple subsystems configured to provide respective virtual servers/services for various user accounts. For example, the system includes a first subsystem virtual desktop interface (VDI) 315, which is configured to provide virtual desktops for accounts subscribing to the service. Virtual desktops allow end-users to remotely connect to and run applications on a virtual desktop computer. The VDI subsystem provides a non-technical interface for authorized end-users of an account to provision resources. In some implementations, the VDI subsystem 315 uses a subsystem VBROKER to issue commands to VMWARE View Horizon Environment. VBROKER is a full VMWARE view software development kit (SDK) that provides the ability to run custom Windows Powershell scripts against a VMWARE View Horizon Environment server in order to create, manage and synchronize information about desktop pool resources of the system. VBROKER may also be applicable to other subsystems shown in FIG. 3, as well as various other applications utilizing VMWARE.

The system also includes a second subsystem Virtual Private Servers (VPS) 320, which can be configured to virtualize various servers for an account. In some implementations, the VPS subsystem 320 automates deployment of resources allocated for an account. For instance, the VPS subsystem 320 may provide various virtual servers/services including, but not limited to, file servers, email servers, web hosting, and virtual meeting services (e.g., VoIP), etc. In some scenarios, the VPS subsystem 320 may be accessible by virtual desktops (via VDI), by external computers (via the internet), or both. In some implementations, the virtual servers/services provided by the VPS subsystem 320 may be configured using a SDK such as XEN. The SDK may be used, for example, to customize and/or maintain virtual services provided by the VPS system for an account.

The system shown in FIG. 3 also includes a third subsystem (Enterprise Cloud) 330 that is configured to provide a virtual data centers for an account. The Enterprise Cloud subsystem 330 allows users to dynamically subscribe to provision resources (e.g., virtual servers/services). Users may create a virtual data center having a pool of resources, which may include a number of VPS-like servers/services. For each account, a respective virtual data center provided by the Enterprise Cloud 330 may be configured to include a number of VPS and/or virtual desktops connected in any number of different configurations. For instance, a virtual data center may include a plurality of redundant virtual file servers and a virtual load balancer that routes traffic to balance traffic load of the virtual file servers. The virtual data center provided by the Enterprise Cloud 330 may include a firewall between a network and the virtual data center. Additionally or alternatively the virtual data center may include firewalls to protect individual virtual servers/desktops in the virtual data center.

In some implementations, a virtual data center provided by the Enterprise Cloud 330 for an account includes a group of virtual desktops and/or virtual servers indicated in respective settings files for the account. The virtual desktops and/or virtual servers in the virtual data center may be provided by the VDI and VPS subsystems 315 and 320 via a shared user interface. The settings file for each account may include server settings for each virtual desktop and/or virtual servers included in the respective virtual data center. The server settings may include a pointer to a VMWARE image and also specify computing resources to dedicate to execution of the corresponding virtual desktops and/or virtual servers. The virtual servers may provide various types of services including, for example, file servers, email servers, web hosting, virtual meeting services (e.g., VoIP), billing, and/or remote computing services, routing, load balancing, and/or switch board services (e.g., Private Branch Exchange).

The virtual desktops and/or virtual servers are interconnected in the virtual data center according to data center configuration settings included in the respective settings files for the account. During operation, computing servers of the Enterprise Cloud 330 emulate the virtual data center by emulating the virtual desktops and/or virtual servers indicated in the server settings, and also emulating the virtual connections specified in the data center configuration settings. In some implementations, emulation of the virtual data centers in the Enterprise Cloud 330 includes execution of a resource management process, configured to assign computing resources allocated for the virtual data center for emulation of the virtual desktops, virtual servers, and connections of the virtual data center.

In some implementations, a virtual data center provides a perimeter firewall between an internal network of the virtual data center and an external network. The perimeter firewall may provide network protection for the virtual data center with stateful packet inspection, access-control lists, NAT, and VPN connections. In some implementations, the virtual data center may also include individual firewalls isolating one or more virtual servers/desktops from other virtual servers/desktops in the virtual data center. In some implementations a web-based GUI is provided for configuration of access rules enforced by the firewall(s) which may include, for example, whitelists or blacklists of services to pass/block and/or users or IP addresses to allow access. The GUI may also be used to configure internet access rules for public facing applications, or to create one or more VPN tunnels connecting one or more end-user networks to the virtual data center.

In some implementations, the virtual data centers run on a VMWARE platform leveraging a fault tolerant storage area network (SAN). In some implementations, the Enterprise Cloud subsystem 330 uses VBROKER to issue commands to VMWARE hosting the virtual servers/desktops. VBROKER provides an application program interface (API) to communicate with VMWARE. For example, VBROKER may translate VPS API calls into commands/scripts against VBLOCK. VBROKER may be used as middleware to issue commands to various platforms (e.g., VMWARE or OPENSTACK).

VMWARE vSphere availability features may be employed to keep the virtual network, and/or the virtual servers and virtual desktops therein, running in the event of a server failure. Features such as vMotion and storage vMotion may also be used to protect against interruption of service due to hardware failure. In some implementations, the servers providing the virtual data center may include fault-tolerant hard-disk storage. For example, each disk may have two serial attached small-computer system-interface (SAS) connectors attaching it to diverse storage processors inside the storage area network. The dual SAS connections allow the storage area network to see the disks on separate data paths and, in the event of a failure, reroute the storage operations through an available path with no noticeable performance impact. In addition, the potential for data loss or corruption due to a bus reset is completely eliminated. The disks themselves reside in storage shelves with redundant power supplies, and cabling attaching the disks to the multiple storage processors. As redundancy is built into the system, redundant virtual servers are not needed to achieve system fault tolerance in the virtual data center.

In some implementations, each account may be allocated a dedicated amount of computing resources of a plurality of computing servers (e.g., in a cloud). For instance, each account may be provided with a certain number of CPU cores, memory, storage, and/or bandwidth, which are dedicated to the account. The pre-allocation of dedicated resources improves reliability in high-traffic conditions.

In some implementations, the plurality of computing servers is also configured to provide a GUI for adjusting configuration settings of the virtual data center. For example, the GUI may provide an interface for an authorized user of the account to configure virtual desktops, virtual servers, connections, and/or settings of the virtual data center. For instance, the GUI may provide an interface to assign a subset of available computing resources (e.g., processing cores/time, memory or storage) for the account to particular virtual desktops and/or virtual servers in the virtual data center. The GUI may also provide a mechanism to import and/or replicate virtual machines in the virtual data center. In some implementations, the GUI may provide the ability to save a backup or snapshot of the layout and configuration of the virtual data center.

The system shown in FIG. 3 also includes a domain name server (DNS) subsystem 340. The DNS subsystem 340 is configured to dynamically map each domain name associated with an account to an IP address of a select virtual server or service provided for the account. For each account, the mapping of domain names is performed according to a respective set of mapping criteria indicated in a settings file of the account.

As indicated above, various mapping criteria may be utilized by the various accounts to map the domain names to the virtual servers/services. For example, the mapping criteria may map domain names as a function of the operating status of the virtual servers/services, processing load of the virtual servers (e.g., load balancing), network traffic conditions (e.g., latency and bandwidth), quality of service requirements, geographical location of an end-user submitting a DNS query, permissions of the end user, date or time of the DNS query, type of virtual server associated with the domain name, and/or number of servers associated with the domain name. In some implementations, the system provides a web-based GUI configured and arranged to allow one or more authorized users for the account to adjust the mapping criteria indicated in the settings file.

In some implementations, the DNS subsystem 340 performs the mapping of the domain name associated with an account according to a respective set of mapping criteria indicated in a settings file of the account. For each account, the DNS subsystem 340 may map domain names to IP addresses of the virtual servers according to various mapping criteria. For example, in some implementations, the mapping criteria may cause the DNS subsystem 340 to map domain names based on the operating status of the virtual servers. For instance, the mapping criteria may map a domain name to a first virtual server while the first virtual server is operating correctly. In response to the first server going down, the mapping criteria may map the domain name to a backup virtual server. As another example, the mapping criteria may cause the DNS subsystem 340 to map domain names based on processing load of the virtual servers. For instance, domain names may be mapped to balance processing load between a plurality of virtual servers. In some implementations, the mapping criteria may cause the DNS subsystem 340 to map domain names based on the geographical location of the user submitting a domain name query to the DNS subsystem 340.

Various implementations may additionally or alternatively use other criteria for mapping of domain names including, but not limited to, date or time of the DNS query, type of virtual server associated with the domain name, number of servers associated with the domain name, and/or permissions of user submitting the DNS query.

In various implementations, a respective set of mapping criteria may be used for each account. This allows the domain names mapping criteria to be customized for the particular needs and services of each account. In some implementations, the DNS subsystem 340 provides a representational state transfer (REST) API for configuration of DNS mapping for an account. In some implementations domain templates, having various preconfigured mapping criteria, may be provided for easy configuration of the DNS subsystem 340 for an account. In some implementations, the DNS subsystem 340 auto-configures mapping based on virtual services provided for the account by the other subsystems (e.g., 315, 320 and/or 330).

In some implementations, the DNS subsystem 340 provides a web-based GUI configured and arranged to allow one or more authorized users of the account to adjust the mapping criteria indicated in the settings file. An authorized user may specify a single set of mapping criteria for all virtual servers associated with the account or may specify a different set of mapping criteria for different types of virtual servers or for different virtual servers of the same type. Further, an authorized user may specify different sets of mapping criteria for different departments or users associated with the account.

In this example, the system also includes a fourth subsystem (Watchdog) 350 configured to monitor status of the virtual servers/services provided for the various accounts. The Watchdog subsystem 350 is configured to determine the operating status of the virtual servers/services provided for each account. For instance, Watchdog subsystem 350 may be configured to monitor services provided by the other subsystems (e.g., 315, 320 and/or 330) for fall over. Watchdog subsystem 350 may provide domain monitoring across multiple services. The Watchdog subsystem 350 may provide real-time event tracking for the services for each account.

In some implementations, the Watchdog subsystem 350 provides a GUI for display and analysis of the operating status of virtual servers/services provided for an account. In some implementations, the GUI is configured to display a respective timeline for each of a plurality of servers. Each timeline may have graphical time blocks for each of the plurality of time periods. Each time block has a graphical indication that describes the operating state of the server during the corresponding time period. The timelines may be rearranged by a user for visual comparison and analysis of the operating state of the virtual servers/services. Such visual analysis may be useful, for instance, for distinguishing between network events affecting multiple servers, and server events affecting an individual server.

Consistent with the above described examples, in some implementations, the Watchdog subsystem 350 may be configured to provide an alert to one or more authorized users of the account if the operating status of the virtual servers/services satisfies alert criteria indicated in an alert policy for the account. The Watchdog subsystem 350 may provide alerts using various messaging mechanisms including, for example, SMS text messages, automated phone calls, emails, and/or other messaging services (e.g., Facebook, Myspace, Twitter, and/or Instant Messengers). In some implementations, multiple notifications are sent to multiple recipients and/or use multiple types of messages. In some implementations, the GUI for adjusting mapping criteria may also be used to adjust the trigger conditions and/or alert message options.

In some implementations, the DNS subsystem 340 is configured to map domain names to the virtual servers/services based on the operating statuses of the virtual servers/services, as determined by the Watchdog subsystem 350. For example, the DNS subsystem 340 may be configured to remap a domain name from a first virtual server to a backup virtual server in response to the first virtual server becoming unresponsive.

The system shown in FIG. 3 also includes a subsystem (Z Common) 360 configured to provide billing for various services provided for an account. The subsystem handles rate plans, usage statistics, and billings for various services of the system. The Z Common subsystem 360 may bill services using flat rates for specified time-periods (e.g., a monthly rate), or using usage rates indicating a specified billing rate for a specified amount of use (e.g., time, amount of data, and/or number of users). The Z Common subsystem 360 is configurable as a plug-and-play component to provide billing services for various independent systems. In some implementations, a GUI is provided for authorized users to manage services, billing options, payment options, account specific alerts, and/or various administrated options. In some implementations, the GUI provides an interface for a user to configure subscription and billing.

The system includes a subsystem (Z Control) 310, which configures settings of one or more of the subsystems for respective accounts of the system. In some implementations, the Z Control subsystem 310 stores data indicating services, provided by the various subsystems (e.g., 315, 320, 330, 340, and/or 350), which are subscribed to for each account. The Z Control subsystem 310 may further store user-configurable settings for the subscribed to services for each respective account. For example, the settings for an account may indicate settings for one or more virtual servers provided for the account by the VPS subsystem 320. In some implementations, the Z Control subsystem 310 may provide a GUI for authorized users of an account to manage virtual services subscriptions, and/or various administrated options.

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., a computing server, a network monitor, and/or a GUI). For example, in certain of the above-discussed embodiments, one or more modules are discrete logic circuits or programmable logic circuits configured and arranged for implementing these operations/activities, as in the blocks shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

The various embodiments described above are provided by way of illustration only and should not be construed to limit the disclosure. Based upon the above discussion and illustrations, those skilled in the art will readily recognize that various modifications and changes may be made without strictly following the exemplary embodiments and applications illustrated and described herein. For instance, although implementations may in some cases be described in individual figures, it will be appreciated that features from one figure can be combined with features from another figure even though the combination is not explicitly shown or explicitly described as a combination. The disclosure may also be implemented using a variety of approaches such as those involving a number of different circuits, operating systems, and/or software programs/packages. Such modifications and changes do not depart from the true spirit and scope of the present disclosure, including that set forth in the following claims.

What is claimed is:

1. A data-communications system comprising
a set of computing servers ("server set") to, for each of a plurality of accounts,
provide a virtual data center including a set of virtual servers, and
access a respective settings file that is associated with the virtual data center and further associated with a plurality of virtual data-communications services ("virtual services") for routing of different types of data communications one of which includes Voice-over-IP (VoIP) services, wherein the respective settings file specifies
the virtual services,
settings of the server set,
settings of virtual desktops to be used in the virtual data center,
a set of mapping criteria that are particular for the respective account and that map each domain name associated with the account to an internet protocol (IP) address of each respective virtual server of the set of virtual servers,
a virtual server subscription,
virtual connections between the virtual desktops and the set of virtual servers, and
access settings to users linked to the respective account with one or more virtual private network (VPN) connections via a perimeter firewall between an internal network of the virtual data center and an external network.

2. The data-communications system of claim 1, wherein the server set provides a graphical-user-interface (GUI) through which an authorized user is to adjust the respective settings file by designating or importing a virtual computing processor, as a resource for providing the virtual services, into the virtual data center for the respective account.

3. The data-communications system of claim 2, wherein the GUI is to, for each of the plurality of accounts, provide an interface for an authorized user of said each of the plurality of accounts, to configure virtual services provided by the virtual data center.

4. The data-communications system of claim 1, wherein the server set provides a graphical-user-interface (GUI) through which an authorized user is to adjust the respective settings file by the authorized user assigning a subset of available computing resources, including one or more of processing resources, memory resources and data storage resources, to a particular one of the virtual desktops or virtual servers included in the virtual data center.

5. The data-communications system of claim 4, wherein the subset of available computing resources include one or more from among the following: CPU cores, memory and memory circuit storage space.

6. The data-communications system of claim 1, wherein each respective set of virtual servers is linked with one of the plurality of accounts in accordance with virtual server subscription settings included in the respective settings file for a corresponding one of the plurality of accounts.

7. The data-communications system of claim 1, wherein the set of virtual servers are communicatively arranged or connected according to network layout and connections as specified in the respective settings file.

8. The data-communications system of claim 1, wherein for each respective account, the settings file specifies an allocation to indicate how certain of the virtual data-communications services are to be allocated based on various criteria, the various criteria including at least two of: processing load, number of users, and priority of the virtual services.

9. The data-communications system of claim 1, wherein the settings file for the corresponding account further specifies virtual connections between the virtual desktops and certain virtual servers from among the set of virtual servers.

10. A storage device containing computer-readable instructions which, upon or in response to execution by one or more computing processors, causes a set of computing servers ("server set") of a data-communications system to perform a set of steps, the set of steps comprising:
for each of a plurality of accounts,
providing a virtual data center including a set of virtual servers, and
accessing a respective settings file that is associated with the virtual data center and further associated with a plurality of virtual data-communications services ("virtual services") for routing of different types of data communications one of which includes Voice-over-IP (VoIP) services, wherein the respective settings file specifies
the virtual services,
settings of the server set,
settings of virtual desktops to be used in the virtual data center,
a set of mapping criteria that are particular for the respective account and that map each domain name associated with the account to an internet protocol (IP) address of each respective virtual server of the set of virtual servers,
a virtual server subscription,
virtual connections between the virtual desktops and the set of virtual servers, and
access settings to users linked to the respective account with one or more virtual private network (VPN) connections via a perimeter firewall between an internal network of the virtual data center and an external network.

11. The storage device of claim 10, wherein the settings file for the respective account further specifies virtual connections between the virtual desktops and certain virtual servers from among the set of virtual servers.

12. The storage device of claim 10, wherein the virtual data center is to include one or more firewalls having settings specified in the settings file.

13. The storage device of claim 10, wherein the virtual data center is to include at least one virtual private network (VPN) tunnel connecting the virtual data center to an external network via the Internet.

14. The storage device of claim 10, wherein the settings file for the respective account further specifies a respective set of computing resources.

15. The storage device of claim 10, wherein the settings file for the respective account further specifies a respective set of computing resources which is configurable through a graphic user interface operable by an authorized user of the virtual data-communications services.

16. A method for use in a data-communications system including a set of computing servers ("server set"), the method comprising:
using the server set, for each of a plurality of accounts, to
provide a virtual data center including a set of virtual servers, and
access a respective settings file that is associated with the virtual data center and further associated with a plurality of virtual data-communications services ("virtual services") for routing of different types of data communications one of which includes Voice-over-IP (VoIP) services, wherein the respective settings file specifies the virtual services, settings of the server set, settings of virtual desktops to be used in the virtual data center, a set of mapping criteria that are particular for the respective account and that map each domain name associated with the account to an internet protocol (IP) address of each respective virtual server of the set of virtual servers, a virtual server subscription, virtual connections between the virtual desktops and the set of virtual servers, and access settings to users linked to the respective account with one or more virtual private network (VPN) connections via a perimeter firewall between an internal network of the virtual data center and an external network.

17. The method of claim 16, further including using the server set, for at least one of the plurality of accounts, to adjust the settings file based on data received from a web-accessible graphical-user-interface (GUI) operable by an authorized user of said at least one of the plurality of accounts.

18. The method of claim 16, wherein the settings file further specifies, for at least a first one of the plurality of accounts, virtual connections between the virtual desktops and the virtual servers.

19. The method of claim 16, further including using the server set based on data received from a web-accessible graphical-user-interface (GUI) operable by an authorized user of at least one of the plurality of accounts, to adjust the settings file and to configure virtual services provided by the virtual data center.

20. The method of claim 16, further including using the server set based on data received from a web-accessible graphical-user-interface (GUI) operable by an authorized user of at least one of the plurality of accounts, to assign a subset of available computing resources including processing resources, memory resources, and data storage resources.

* * * * *